(12) United States Patent
Gaid et al.

(10) Patent No.: US 9,126,149 B2
(45) Date of Patent: Sep. 8, 2015

(54) METHOD FOR TREATING WATER IN ORDER TO DESALINATE SAID WATER, INCLUDING TREATING CONCENTRATES

(75) Inventors: Abdelkader Gaid, Paris (FR); Michel Coeytaux, Angoulins (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 899 days.

(21) Appl. No.: 13/376,302

(22) PCT Filed: Jun. 3, 2010

(86) PCT No.: PCT/EP2010/057801
§ 371 (c)(1),
(2), (4) Date: Mar. 7, 2012

(87) PCT Pub. No.: WO2010/139773
PCT Pub. Date: Dec. 9, 2010

(65) Prior Publication Data
US 2012/0152721 A1    Jun. 21, 2012

(30) Foreign Application Priority Data
Jun. 4, 2009 (FR) ...................... 09 53700

(51) Int. Cl.
*B01D 61/00* (2006.01)
*B01D 63/00* (2006.01)
(Continued)

(52) U.S. Cl.
CPC ............. *B01D 61/022* (2013.01); *B01D 61/025* (2013.01); *B01D 61/027* (2013.01); *C02F 9/00* (2013.01); *B01D 2317/022* (2013.01); *C02F 1/06* (2013.01); *C02F 1/441* (2013.01); *C02F 1/442* (2013.01); *C02F 2001/422* (2013.01); *C02F 2001/425* (2013.01); *C02F 2103/08* (2013.01)

(58) Field of Classification Search
CPC ............ C02F 1/441; C02F 1/42; C02F 1/442; C02F 2303/16; C02F 1/04; B01D 61/025; B01D 61/027
USPC ........... 210/652, 257.2, 195.2, 175, 180, 661, 210/664, 670, 673, 677
See application file for complete search history.

(56) References Cited

U.S. PATENT DOCUMENTS 8,815,096 B2 *  8/2014  Zuback et al. ................ 210/638
2008/0277344 A1 * 11/2008 SenGupta et al. ............ 210/652
(Continued)

FOREIGN PATENT DOCUMENTS

GB      2394678      5/2004

*Primary Examiner* — Ana Fortuna
(74) *Attorney, Agent, or Firm* — Coats and Bennett, PLLC

(57) ABSTRACT

A method and system for treating water in order to desalinate the water where the system and method includes a reverse osmosis or distillation unit for producing a first concentrate and at least partially desalinated water. The first concentrate stream is directed to a first demineralization unit which utilizes nanofiltration membranes to treat the first concentrate stream so as to produce a permeate and a second concentrate stream. The second concentrate stream is directed to a second demineralization unit that includes an ion exchange device which in turn treats the second concentrate stream by producing a stream of at least partially demineralized water and third concentrate stream. The stream of at least partially demineralized water is mixed with the stream of at least partially desalinated water produced by the reverse osmosis or distillation unit.

9 Claims, 2 Drawing Sheets

(51) Int. Cl.
*C02F 1/44* (2006.01)
*C02F 1/42* (2006.01)
*B01D 61/02* (2006.01)
*C02F 9/00* (2006.01)
*C02F 1/06* (2006.01)
*C02F 103/08* (2006.01)

(56) References Cited

U.S. PATENT DOCUMENTS

2012/0152721 A1\* 6/2012 Gaid et al. ............... 203/10
2013/0043190 A1\* 2/2013 Al-Samadi ............... 210/652

\* cited by examiner

METHOD FOR TREATING WATER IN ORDER TO DESALINATE SAID WATER, INCLUDING TREATING CONCENTRATES

This application is a U.S. National Stage Application of PCT Application No. PCT/EP2010/057801, with an international filing date of 3 Jun. 2010. Applicant claims priority based on French Patent Application No. 0953700 filed 4 Jun. 2009. The subject matter of these applications is incorporated herein.

FIELD OF THE INVENTION

The field of the invention is that of water treatment. More specifically, the invention relates to the treatment of water, in particular seawater or brackish water, for desalination of same.

PRIOR ART

Desalination of seawater is a practice commonly implemented in order to reduce the concentration of various salts dissolved in the water. To this end, it is known to filter salt-rich water through reverse osmosis membranes. This type of filtration by reverse osmosis can be applied to any type of water containing salts such as seawater or brackish water.

This type of treatment by reverse osmosis is particularly effective in that it enables purified water (or permeate), with a considerably reduced salt concentration, to be produced. This is shown clearly in the columns of table 1, which shows the results of the treatment of seawater by reverse osmosis with a conversion rate equal to 52.8%. It is noted that the conversion rate is equal to the ratio of the flow rate of the treated water produced over the flow rate of water to be treated.

TABLE 1 results of the treatment of seawater by reverse osmosis with a conversion rate of 52.8%.

| Parameters | Seawater | Desalinated water (reverse osmosis) | Concentrate |
|---|---|---|---|
| Cations (mg/l) | | | |
| $Ca^{2+}$ | 444.4 | 0.15 | 840.1 |
| $Mg^{2+}$ | 1382.7 | 0.47 | 2616.3 |
| $Ba^{2+}$ | 1.10 | 0.1 | 1.9 |
| $Na^{2+}$ | 12221.5 | 19.6 | 23056.6 |
| $K^+$ | 416.1 | 0.85 | 784.3 |
| $Sr^+$ | 4.94 | 0.1 | 9.34 |
| Anions (mg/l) | | | |
| $Cl^-$ | 21754 | 32.10 | 41046.02 |
| $SO_4^{2-}$ | 2963.2 | 0.40 | 5610.26 |
| $HCO_3^-$ | 168.4 | 0.38 | 311.29 |
| $CO_3^{2-}$ | 3.5 | 0.000 | 9.49 |
| $NO_3^-$ | 1.0 | 0.00 | 1.87 |
| Bore | 5.4 | 0.35 | 9.06 |
| $F^-$ | 1.5 | 0.02 | 2.80 |

It may indeed be observed that the concentrations of the various salts initially present in the seawater are considerably reduced in the desalinated water obtained after treatment by reverse osmosis. The concentration of certain species in the desalinated water can reach values close to zero.

Another technique is commonly implemented in order to desalinate water. It involves distillation, and more specifically MSF-type (or Multi-Stage Flash) or MED-type (or Multi-Effect Distillation) distillation.

Such techniques of desalination by distillation are also particularly effective for reducing salts contained in the water to be treated.

However, desalination by reverse osmosis or by distillation, even if it is particularly effective, is not without disadvantages.

DISADVANTAGES OF THE PRIOR ART

In particular, desalination of water by reverse osmosis or by distillation is accompanied by the production and rejection of concentrates in the natural environment.

These concentrates have very high concentrations of salts initially present in the water to be treated. This is shown in the right-hand column of table 1 in which the concentrations of the different salts present in these concentrates are shown. It may in particular be observed that these concentrates are particularly rich in calcium and magnesium ions and bicarbonates.

In general, the concentration of organic and inorganic substances present in these concentrates is around 1.8 to 2 times higher than their initial concentration in the seawater. It is thus estimated that for a dissolved salt concentration in seawater on the order of 34 g/l, the salt concentration of the concentrate varies from 61 to 68 g/l.

Due to high salt concentrations of these concentrates, their rejection into the natural environment is not neutral, but may instead have a notable impact.

In particular, during desalination of seawater, these concentrates are rejected into the sea. This causes a sudden localized change in the salinity of the water. It has been observed that even if some animal or plant species are not affected by these sudden modifications of their environment, others are particularly sensitive to them.

The rejection of these concentrates into the natural environment therefore requires taking a certain number of precautions. In particular, various parameters such as ocean currents, meteorological conditions, and the type and/or abundance of certain animal or plant species, are taken into consideration in order to perform these rejections while limiting the impact thereof on the environment.

However, in certain areas in which such rejections are performed, irreversible effects on the lives, behavior and development of certain animal or plant species have been observed.

Another disadvantage of this desalination technique is related to the fact that concentrates it produces have an important volume as it contains a relatively important part of water.

The rejection into the natural environment of these concentrates has, in brief, two major disadvantages:

rejection into the natural environment of a large amount of inorganic and organic species initially present in the water to be treated;

loss in production of treated water.

OBJECTIVES OF THE INVENTION

The invention is intended in particular to overcome these disadvantages of the prior art.

More specifically, an objective of the invention is, in at least one embodiment, to provide a water desalination technique of which the implementation exerts only a limited impact on the environment, at least by comparison with the techniques of the prior art.

In particular, an objective of the invention is, in at least one embodiment, to provide such a technique that causes the amount of concentrate rejected into the natural environment to be reduced.

The invention also has the objective of enabling the implementation of such a technique that leads to the production of treated water in greater amounts than enabled by the techniques of the prior art.

Yet another objective of this invention is to provide, in at least one embodiment of the invention, such a technique that requires fewer maintenance actions, at least by comparison with the prior art techniques.

The invention is also intended to provide such a technique that is simple to implement and that is effective and economical.

DESCRIPTION OF THE INVENTION

These objectives, as well as others that will appear below, are achieved by a process for treating water for desalination of same, including a step of reverse osmosis or distillation of said water so as to produce water that is at least partially desalinated and a first concentrate.

According to the invention, such a process includes the following steps:

a first demineralization step, including a step of nanofiltration of said first concentrate so as to produce a permeate and a second concentrate;

a second step of demineralization of said second concentrate by means of at least one active material including cationic- and/or anionic-type ion exchange resins, said second demineralization step including the extraction of a third concentrate and the extraction of an at least partially demineralized water, said at least partially demineralized water being mixed with said at least partially desalinated water;

a step of regenerating said at least one active material, said regeneration step including a step of recirculation of said permeate.

Thus, the invention is based on an innovative approach to water desalination, which consists of demineralizing the first concentrate resulting from the water desalination by reverse osmosis or distillation, then demineralizing, by means of an active material, the second concentrate resulting from this first demineralization, so as to produce partially demineralized water and a third concentrate.

The demineralized water thus produced is mixed with the desalinated water resulting from the reverse osmosis or the distillation. This causes the volume of water produced to increase.

In addition, the demineralized water contains a certain number of species present in the second concentrate. The recycling thereof in the desalinated water eliminates rejection of the species that it contains into the natural environment.

The volume of residue resulting from the implementation of a process according to the invention is therefore considerably reduced.

Consequently, the impact of the rejection into the natural environment of concentrates resulting from the implementation of a process according to the invention is lower than that of the rejection of concentrates resulting from the implementation of processes according to the prior art.

Furthermore, the permeate resulting from the demineralization of the first concentrate is recirculated so as to enable the regeneration of the active material used for demineralization of the second concentrate. This enables the need for an external water supply in order to perform said regeneration to be avoided, and therefore the maintenance costs to be reduced.

The implementation of ion exchange resins enables the sulfates ($SO_4^{2-}$) and other cations and anions present in the second concentrate to be retained effectively in order to produce at least partially demineralized water.

The implementation of a first demineralization step by nanofiltration enables a large part of the cations and anions initially present in the first concentrate to be effectively eliminated.

Preferably, said ion exchange resins are arranged in series or in mixed beds.

In this case, said nanofiltration step preferably implements membranes of which the cutoff is below 200 Daltons.

This enables a conversion rate of between 60 and 85% to be obtained.

A process according to the invention advantageously includes a step of evaluating the salt concentration of said first concentrate, a step of comparing said concentration with a reference value and a step of implementing said first demineralization step and/or said second demineralization step on the basis of said comparison.

This implementation enables one and/or the other of the first and second demineralization steps to be bypassed (or shunted) when the salt concentration of the first concentrate is low enough.

A process according to the invention includes a step of cooling said first concentrate.

In this case, said cooling step includes a step of circulating said first concentrate and said at least partially demineralized water in a heat exchanger.

The fact of cooling the first concentrate when its temperature becomes too high enables damage to the nanofiltration membranes implemented for the first demineralization to be prevented.

The technique discussed also relates to an installation for implementing a water treatment process according to the invention, said installation including a reverse osmosis or distillation unit.

According to the invention, such an installation includes:

first demineralization means, including membranes for nanofiltration of a first concentrate coming from said unit;

second demineralization means of a second concentrate coming from said first demineralization means, said second demineralization means including at least one active material including cationic- and/or anionic-type ion exchange resins;

supplying means of at least partially demineralized water coming from said second demineralization means in at least partially desalinated water coming from said unit;

regeneration means of said at least one active material, said regeneration means including means for recirculating a permeate coming from said first demineralization means to said second demineralization means.

Such an installation preferably includes a heat exchanger, said heat exchanger having a first inlet for said first concentrate, a second inlet for said at least partially demineralized water, a first outlet for the first concentrate connected to said first demineralization means, and a second outlet for said at least partially demineralized water leading into said at least partially desalinated water.

In this case, an installation according to the invention advantageously includes means for measuring the temperature of said first concentrate, means for comparing said temperature with a predetermined threshold value, means for routing said at least partially demineralized water to said exchanger, and means for controlling said means for routing on the basis of said comparison.

It is thus possible to cool the first concentrate when its temperature becomes too high so as to prevent damage to the nanofiltration membranes implemented for the first demineralization.

LIST OF FIGURES

Other features and advantages will appear more clearly in the following description of preferred embodiments, provided as simple illustrative and non-limiting examples, and the appended drawings, in which.

DESCRIPTION OF EMBODIMENTS OF THE INVENTION

1. Summary of the Principle of the Invention

The invention relates to the optimization of the desalination of water by reverse osmosis or distillation.

The general principle of the invention is based more precisely on the implementation, in such a process, of a first demineralization of the first concentrate coming from the desalination, of a second demineralization, by means of an active material, of the second concentrate coming from this first demineralization, and on the mixing of the demineralized water thus obtained with the desalinated water resulting from the desalination.

The implementation of a process according to the invention thus enables a larger volume of desalinated water to be produced.

It also enables, due to the fact that the demineralized water contains a certain amount of salts that were present in the concentrate resulting from the first demineralization, the rejection of said salts into the natural environment to be avoided.

In addition, this aspect of the invention makes it possible to help to reduce the volume of concentrate rejected into the natural environment.

The impact of the desalination by the implementation of a process according to the invention is therefore lower than that of the desalination techniques according to the prior art.

The general principle of the invention is also based on the recirculation of the permeate resulting from the first demineralization so as to regenerate the active material used for the second demineralization.

This enables the need for an external water supply in order to perform said regeneration to be avoided, and therefore the maintenance costs to be reduced. This also has an impact on the environment insofar as the water consumption for maintenance is reduced.

2. Example of a First Embodiment of the Invention 2.1 Installation

Figure 1:
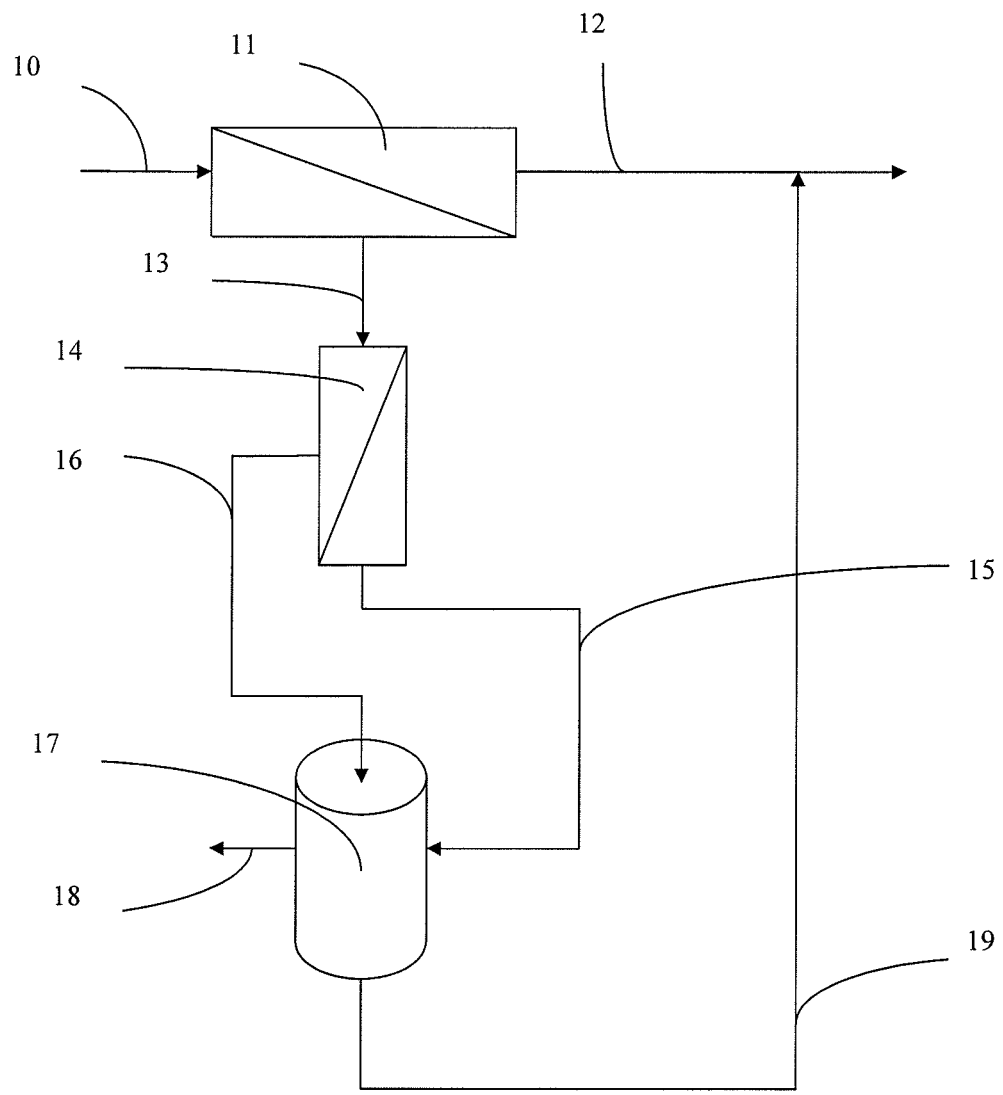
FIG. 1 shows a first embodiment of an installation according to the invention.

In reference to FIG. 1, a first embodiment of an installation for implementing a process according to the invention is presented.

As shown in said FIG. 1, such an installation includes a supply pipe for water to be treated 10. This pipe 10 leads into a treatment or desalination unit 11.

The treatment unit 11 can be a reverse osmosis unit including a plurality of membranes provided for this purpose. In an alternative, the unit 11 can include a distillation unit. More specifically, it may be a MED- or MSF-type distillation unit. This treatment unit 11 has a first outlet that is connected to a discharge pipe 12 for at least partially desalinated water. It has a second outlet that is connected to a pipe 13 for extracting a first concentrate.

The pipe 13 leads into a first demineralization unit 14.

The demineralization unit 14 is a filtration unit. It advantageously integrates a plurality of nanofiltration membranes of which the cutoff is below 200 Daltons. This first demineralization unit 14 has a first outlet that is connected to a permeate discharge pipe 15. It also has a second outlet that is connected to a second concentrate extraction pipe 16.

The extraction pipe 16 leads into a second demineralization unit 17.

The second demineralization unit 17 consists of a reactor housing ion exchange resins. These ion exchange resins can be cationic resins, anionic resins or mixed resins, i.e. comprised of a mixture of anionic resins and cationic resins. The choice of the type of resins implemented is dependent on the type of water treated and operating constraints. In addition, this second unit 17 has an inlet to which the discharge pipe 15 is connected. It also has a first outlet that is connected to a third concentrate extraction pipe 18. It also has a second outlet that is connected to supply means including discharge pipe for at least partially demineralized water 19.

The discharge pipe for at least partially demineralized water 19 leads into the discharge pipe 12 for at least partially desalinated water.

Such an installation also includes means for measuring the salt concentration of the first concentrate and means for comparing the value measured with a threshold value so as to bypass (or shunt) the implementation of one or the other of the first and second demineralization units when the salt concentration of the first concentrate is low enough. Secondary pipe networks (not shown) are provided for this purpose.

2.2 Process

A process for treating water by implementing an installation according to this first embodiment will now be described.

Such a water treatment process consists of routing the water to be treated into the desalination unit 11 by means of the pipe 10. The water to be treated then undergoes reverse osmosis or distillation.

The implementation of such a reverse osmosis or distillation step leads to the production of 45 to 85% of at least partially desalinated water and 15 to 55% of a first concentrate rich in salts initially contained in the water to be treated.

The at least partially desalinated water is discharged from the desalination unit 11 by means of the discharge pipe 12. The first concentrate is discharged from the desalination unit 11 by means of the extraction pipe 13.

This concentrate is then routed in the direction of the first demineralization unit 14. There, it undergoes a nanofiltration phase through membranes of which the cutoff threshold is preferably below 200 Daltons.

This step of nanofiltration of the first concentrate enables divalent cations or anions such as sulfates, calcium, magnesium, carbonates, and so on to be removed. The conversion rate of this nanofiltration step is advantageously between 60 and 85%. It is noted in this regard that the conversion rate is equal to the ratio between the flow rate of permeate produced and the flow rate of concentrate at the inlet of the first demineralization unit 14.

The implementation of such a nanofiltration step leads to the production of 60 to 85% of a permeate containing monovalent cations and anions, such as chlorides, sodium, potassium, etc., and 15 to 40% of a second concentrate containing divalent cations and anions, such as sulfates, calcium, magnesium, carbonates, and so on.

The permeate is discharged from the first demineralization unit 14 by means of the discharge pipe 15. The second concentrate is extracted from this demineralization unit 14 via the extraction pipe 16.

This second concentrate is then routed to the inlet of the second demineralization unit 17. There, it undergoes demineralization by being placed in contact with ion exchange resins.

This demineralization on ion exchange resins enables the sulfates and other divalent cations and anions present in the second concentrate to be retained.

The permeate coming from the first demineralization unit 14 is recirculated inside the second demineralization unit 17 via the pipe 15. This recirculation enables a regeneration of the ion exchange resins to be implemented.

The implementation of this second demineralization step leads to the production of a third concentrate and at least partially demineralized water.

This third concentrate is extracted from the second demineralization unit 17 and rejected into the natural environment via the extraction pipe 18.

The at least partially demineralized water is discharged from the second demineralization unit 17 via the discharge pipe 19. This demineralized water is then mixed with the at least partially desalinated water circulating in the discharge pipe 12.

The means for measuring the salt concentration of the first concentrate and means for comparing the value measured with a threshold value are implemented so as to bypass (or shunt) the implementation of one or the other of the first and second demineralization units when the salt concentration of the first concentrate is low enough.

3. Example of a Second Embodiment of the Invention

3.1 Installation

Figure 2:
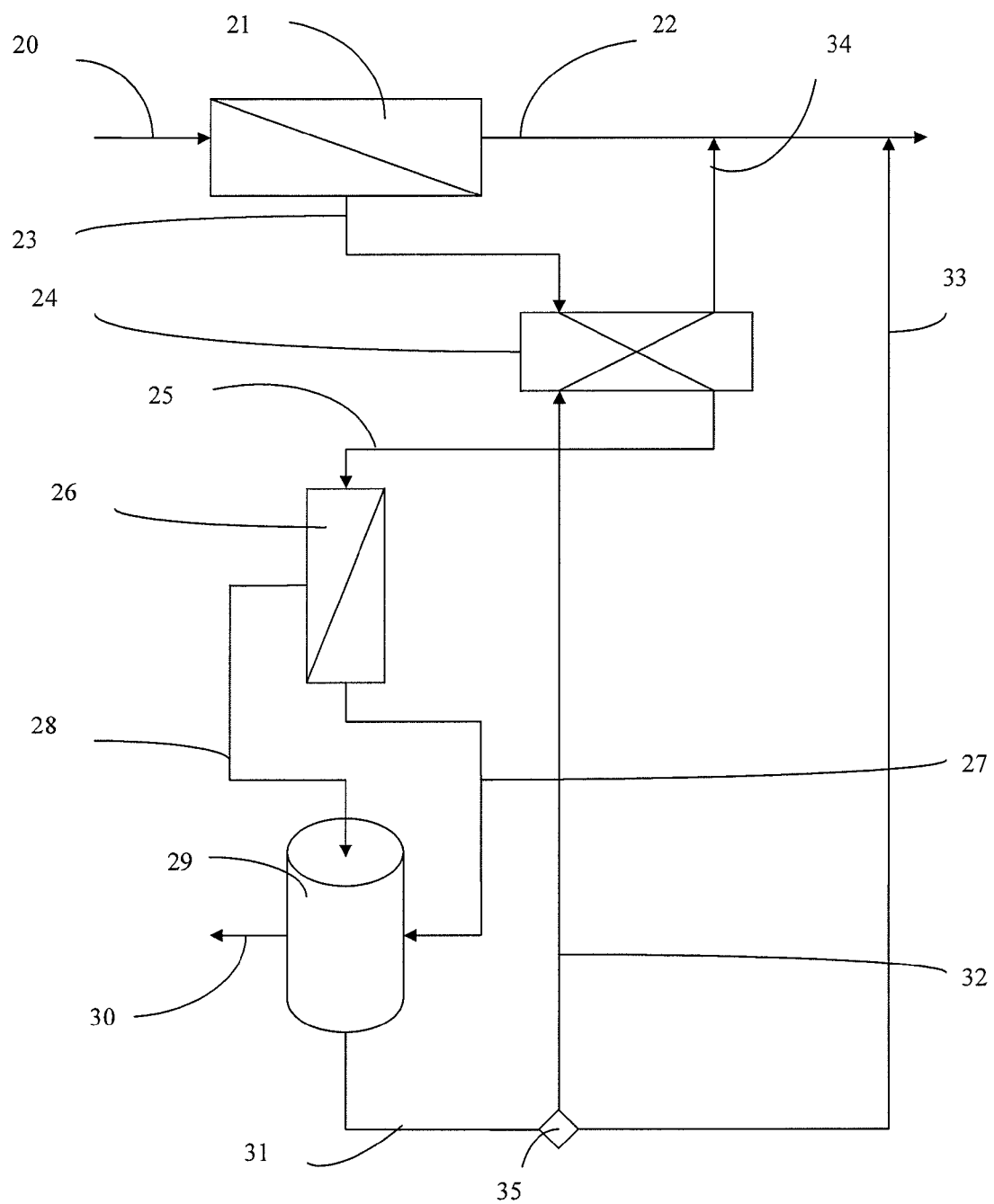
FIG. 2 shows a second embodiment of an installation according to the invention.

In reference to FIG. 2, a second embodiment of an installation for implementing a process according to the invention is presented.

As shown in said FIG. 2, such an installation includes a supply pipe for water to be treated 20. This pipe 20 leads into a treatment or desalination unit 21.

The treatment unit 21 can be a reverse osmosis unit including a plurality of membranes provided for this purpose. In an alternative, the unit 21 can include a distillation unit. More specifically, it may be a MED- or MSF-type distillation unit. This treatment unit 21 has a first outlet that is connected to a discharge pipe 22 for at least partially desalinated water. It has a second outlet that is connected to a pipe 23 for extracting a first concentrate.

The pipe 23 leads into a first inlet of a heat exchanger 24.

The heat exchanger 24 is in this case a water/water exchanger. It has a first outlet that is connected to a pipe 25 leading into a first demineralization unit 26.

The first demineralization unit 26 is a filtration unit. It advantageously integrates a plurality of nanofiltration membranes of which the cutoff is below 200 Daltons. This first demineralization unit 26 has a first outlet that is connected to a permeate discharge pipe 27. It also has a second outlet that is connected to a second concentrate extraction pipe 28.

The extraction pipe 28 leads into a second demineralization unit 29.

The second demineralization unit 29 consists of a reactor housing ion exchange resins. These ion exchange resins can be cationic resins, anionic resins or mixed resins, i.e. comprised of a mixture of anionic resins and cationic resins. The choice of the type of resins implemented is dependent on the type of water treated and operating constraints. In addition, this second unit 29 has an inlet to which the discharge pipe 27 is connected. It also has a first outlet that is connected to a third concentrate extraction pipe 30. It also has a second outlet that is connected to a discharge pipe for at least partially demineralized water 31.

The discharge pipe for at least partially demineralized water 31 leads to a solenoid valve 35 to which supply means including two pipes 32 and 33 are connected.

The pipe 32 is connected to a second inlet of the exchanger 24, which has a second outlet connected to a pipe 34 leading into the discharge pipe 22.

The pipe 33 also leads into the discharge pipe 22.

Control means, which are not shown in the figures, are connected to the solenoid valve 35 as well as to means for measuring the temperature of the first concentrate coming from the desalination unit 21.

Such an installation also includes means for measuring the salt concentration of the first concentrate and means for comparing the value measured with a threshold value so as to bypass (or shunt) the implementation of one or the other of the first and second demineralization units when the salt concentration of the first concentrate is low enough. Secondary pipe networks (not shown) are provided for this purpose.

3.2 Process

A process for treating water by implementing an installation according to this second embodiment will now be described.

Such a water treatment process consists of routing the water to be treated into the desalination unit 21 by means of the pipe 20. The water to be treated then undergoes reverse osmosis or distillation.

The implementation of such a reverse osmosis or distillation step leads to the production of 45 to 85% of at least partially desalinated water and 15 to 55% of a first concentrate rich in salts initially contained in the water to be treated.

The at least partially desalinated water is discharged from the desalination unit 21 by means of the discharge pipe 22. The first concentrate is discharged from the desalination unit 21 by means of the extraction pipe 23.

This concentrate is then routed in the direction of the inlet of the exchanger 24 inside of which its temperature is reduced. The concentrate is then discharged from the exchanger 24, then routed to the inlet of the first demineralization unit 26 via the pipe 25. There, it undergoes a nanofiltration phase through membranes of which the cutoff threshold is preferably below 200 Daltons.

This step of nanofiltration of the first concentrate enables divalent cations or anions such as sulfates, calcium, magnesium, carbonates, and so on to be removed. The conversion rate of this nanofiltration step is advantageously between 60 and 85%. It is noted in this regard that the conversion rate is equal to the ratio between the flow rate of permeate produced and the flow rate of concentrate at the inlet of the first demineralization unit 26.

The implementation of such a nanofiltration step leads to the production of 60 to 85% of a permeate containing monovalent cations and anions, such as chlorides, sodium, potassium, etc., and 15 to 40% of a second concentrate containing divalent cations and anions, such as sulfates, calcium, magnesium, carbonates, and so on.

The permeate is discharged from the first demineralization unit 26 by means of the discharge pipe 27. The second concentrate is extracted from this demineralization unit 26 via the extraction pipe 28.

This second concentrate is then routed to the inlet of the second demineralization unit 29. There, it undergoes demineralization by being placed in contact with ion exchange resins.

This demineralization on ion exchange resins enables the sulfates and other divalent cations and anions present in the second concentrate to be retained.

The permeate coming from the first demineralization unit 26 is recirculated inside the second demineralization unit 29 via the pipe 27. This recirculation enables a regeneration of the ion exchange resins to be implemented.

Indeed, this permeate contains chlorides that were not eliminated during the passage of the first concentrate in the first demineralization unit. The ions attached to the resins during the treatment are exchanged against the chloride ions present in this permeate. The resin then returns to its initial state.

It is noted that the sodium chloride concentration is between 125 and 250 grams of NaCl per liter of resin.

The implementation of this second demineralization step leads to the production of a third concentrate and at least partially demineralized water.

This third concentrate is extracted from the second demineralization unit 29 and rejected into the natural environment via the extraction pipe 30.

The at least partially demineralized water is discharged from the second demineralization unit 29 via the discharge pipe 31.

The flow of an at least partially demineralized water is distributed between pipes 32 and 33.

The portion of water circulating inside pipe 33 is directly mixed with the desalinated water circulating in pipe 22.

The portion of water circulating in pipe 32 is routed to an inlet of the exchanger 24. It circulates inside this exchanger so as to cool the first concentrate coming from the desalination unit 21. The demineralized water is then discharged from the exchanger 24 and mixed via the pipe 34 with the desalinated water circulating in the pipe 22.

The control and measurement means are implemented so as to measure the temperature of the first concentrate coming from the desalination unit 21 and compare the value of this temperature with a threshold value. These control means control the opening and closing of the solenoid valve 35 on the basis of this comparison. Thus, when the temperature of the first concentrate is above a certain threshold, the solenoid valve 35 is controlled so that a portion of the at least partially demineralized water flows into the pipe 32 and passes through the exchanger 24 so as to reduce the temperature of the first concentrate. Conversely, when the temperature of the first concentrate is below a certain threshold, the solenoid valve 35 is controlled so that all of the at least partially demineralized water flows into the pipe 33.

The fact of cooling the first concentrate when its temperature becomes too high enables damage to the nanofiltration membranes housed in the first demineralization unit 26 to be prevented.

The means for measuring the salt concentration of the first concentrate and means for comparing the value measured with a threshold value are implemented so as to bypass (or shunt) the implementation of one or the other of the first and second demineralization units when the salt concentration of the first concentrate is low enough.

4. Tests 4.1 Demineralization

Tests have been conducted so as to determine the concentrations of species present in the permeates and concentrates generated by the implementation of a process according to the first embodiment of the invention.

The desalination installation implemented in the context of these tests was operated 24 hours per day and treated 1000 $m^3$/day of water to be desalinated.

The installation comprised a plurality of reverse osmosis filtration units. It should be noted that the number of units was dependent on the amount of treated water to be produced.

In these tests, the flow rate of concentrate to be treated coming from the reverse osmosis was on the order of 550 $m^3$/day.

The concentrates coming from the reverse osmosis were treated in a plurality of nanofiltration units. It should be noted that the number of units was dependent on the amount of concentrate to be treated.

The permeate coming from the nanofiltration was sent at a flow rate on the order of 330 $m^3$/day to a storage tank to be used during the regeneration of ion exchange resins.

The volume of concentrate produced by the implementation of the nanofiltration was on the order of 220 $m^3$/day.

During these tests, the ion exchange resin demineralization unit included a first and a second independent reactor mounted in series. The first reactor housed a mixture of strong cationic-type ion exchange resins and inert ion exchange resins. The second reactor housed a mixture of strong anionic-type ion exchange resins and inert ion exchange resins. It is also possible to envisage implementing ion exchange resins in a mixed bed.

The volume of the third concentrate coming from the regeneration of ion exchange resins was on the order of 30 $m^3$/day. The volume of demineralized water collected from the ion exchange resin treatment was on the order of 300 $m^3$/day. This water volume added to that coming from the reverse osmosis led to the production of around 750 $m^3$/day of partially desalinated water.

The regeneration of ion exchange resins was implemented when the reverse osmosis units were stopped. The duration of these stops could range from 4 to 48 hours, which is sufficient for effective regeneration.

The regeneration of ion exchange resins was activated manually by actuation of a push-button. It could also be activated automatically once a predetermined volume of water to be treated is reached or when the conductivity at the outlet of the ion exchangers reaches a predetermined value.

The concentrations of species present in the permeates and concentrates generated during these tests are grouped in tables 2 and 3.

TABLE 2 results of first demineralization

| Parameters | First concentrate | Second concentrate | Permeate |
|---|---|---|---|
| Cations (mg/l) | | | |
| $Ca^{2+}$ | 840.1 | 2,030 | 28 |
| $Mg^{2+}$ | 2,616.3 | 6,250 | 101 |
| $Ba^{2+}$ | 1.90 | 2.0 | 0.9 |
| $Na^{2+}$ | 23,056.6 | 49,580 | 5,318 |
| $K^+$ | 784.3 | 455 | 602 |
| $Sr^+$ | 9.34 | 10.6 | 4 |
| Anions (mg/l) | | | |
| $Cl^-$ | 41,046.02 | 95,760 | 4,568 |
| $SO_4^{2-}$ | 5,610.26 | 13,890 | 101 |
| $HCO_3^-$ | 311.29 | 751 | 18 |
| $NO_3^-$ | 1.87 | 3.5 | 0.65 |
| Bore | 9.06 | 15 | 3 |

TABLE 3 results of second demineralization

| Parameters | Second concentrate | Third concentrate | Partially demineralized water |
|---|---|---|---|
| Cations (mg/l) | | | |
| $Ca^{2+}$ | 2,030 | 18,270 | 203 |
| $Mg^{2+}$ | 6,250 | 56,250 | 625 |
| $Ba^{2+}$ | 2.0 | 17 | 0.3 |
| $Na^{2+}$ | 49,580 | 490,000 | 495 |
| $K^+$ | 455 | 4,000 | 45 |
| $Sr^+$ | 10.6 | 100 | 0.5 |
| Anions (mg/l) | | | |
| $Cl^-$ | 95,760 | 910,000 | 4,790 |
| $SO_4^{2-}$ | 13,890 | 125,000 | 1,390 |
| $HCO_3^-$ | 751 | 6,900 | 75 |
| $NO_3^-$ | 3.5 | 35 | — |
| Bore | 15 | 149 | 1 |

During these tests, the conversion rates of the first and second demineralization were respectively 60% and 90%.

It is clear from these tables that the partially demineralized water that is mixed with the desalinated water contains a certain proportion of salts initially present in the second concentrate. In this way, the third concentrate that is rejected into the natural medium contains fewer salts.

4.2 Production

A desalination technique, which, according to the prior art, implements a reverse osmosis treatment has a conversion rate of between 42 and 48%. In other words, this technique of the prior art enables between 42 and 48% desalinated water and between 52 and 58% concentrate to be produced.

A technique, which, according to the invention, implements reverse osmosis, then nanofiltration and finally a treatment on ion exchange resins has an overall conversion rate of between 55 and 75%. In other words, the technique of the invention enables between 55 and 75% desalinated water and between 25 and 45% concentrate to be produced.

Indeed, according to the invention, the efficiency of the nanofiltration is between 30 and 50%, while that of the treatment on ion exchange resins is between 50 and 70%.

Thus, at the end of the reverse osmosis, according to the invention, between 42 and 48% permeate are obtained. The concentrate, which represents between 52 and 58%, i.e. an average of 55%, is then treated by nanofiltration. Between 16.5 and 27.5% permeate and between 27.5 and 38.5% concentrate are then obtained. This concentrate is then treated on ion exchange resins. Between 13.75 and 26.95% at least partially demineralized water and between 11.55 and 13.75% concentrate are then obtained.

The technique according to the invention thus enables between 55, 75 and 74, 95% treated water (mixture of an at least partially desalinated water and an at least partially demineralized water) to be produced.

The technique according to the invention therefore enables an overall production of:
- between 55 and 75% treated water, and
- between 25 and 45% concentrate,
- i.e. around 44% more treated water, and
- 36% less concentrate.

Advantages

The implementation of a process for treating water according to the invention has in particular the following advantages, by comparison with the prior art techniques.

First:
- the amount of desalinated water produced is greater;
- the volume of concentrate to be rejected into the natural environment is significantly reduced;
- the external water consumption for the regeneration of ion exchange resins is zero.

The implementation of a treatment process according to the invention therefore enables the impact of water desalination on the environment to be reduced.

Second:
- the permeate is used to regenerate the ion exchange resins;
- damage to nanofiltration membranes is controlled by the implementation of the exchanger enabling the first concentrate to be cooled.

The implementation of a treatment process according to the invention also enables the costs of water desalination to be reduced.

The invention claimed is:

1. A process for desalinating water, comprising:
  a. directing the water to a reverse osmosis or distillation unit and producing at least partially desalinated water and a first concentrate;
  b. directing the first concentrate to a first demineralization unit and subjecting the first concentrate to nanofiltration which produces a permeate and a second concentrate;
  c. directing the second concentrate to a second demineralization unit that includes an ion exchange having at least one active material including a cationic or anionic-type ion exchange resin and treating the second concentrate in the ion exchange to produce a third concentrate and at least partially demineralized water;
  d. mixing the at least partially demineralized water with the at least partially desalinated water;
  e. regenerating the ion exchange resin; and
  f. utilizing the permeate produced by the first demineralization unit to regenerate the ion exchange resin.

2. The process of claim 1 including monitoring the salt concentration of the first concentrate; comparing the salt concentration of the first concentrate with a threshold value; and operating the first or second demineralization units based on the comparison and including bypassing the first or second demineralization units when the salt concentration of the first concentrate is below the threshold value.

3. The process of claim 1 including cooling the first concentrate by directing the first concentrate through a heat exchanger.

4. The process of claim 1 including directing the first concentrate and the at least partially demineralized water through a heat exchanger and cooling the first concentrate.

5. The process of claim 1 wherein the first demineralization unit includes nanofiltration membranes having a cut-off which is less than 200 Daltons.

6. The process of claim 1 wherein the active material of the second demineralization unit includes cationic or anionic-type ion exchange resins which are arranged in series or in a mixed bed.

7. The process of claim 1 wherein the second demineralization unit comprises a reactor having ion exchange resins made up of a mixture of anionic and cationic resins.

8. The process of claim 1 wherein the reverse osmosis or distillation unit produces 45-85% of at least partially desalinated water and 15-55% of the first concentrate which is rich in salts.

9. A system for desalinating water, comprising:
   a. a reverse osmosis or distillation unit including an inlet for receiving water to be treated and wherein the reverse osmosis or distillation unit produces at least a partially desalinated water stream and a first concentrate stream;
   b. a first demineralization unit for treating the first concentrate stream;
   c. the first demineralization unit including nanofiltration membranes and an inlet for receiving the first concentrate stream;
   d. a first concentrate line operatively interconnected between the reverse osmosis or distillation unit and the first demineralization unit for conveying the first concentrate stream to the first demineralization unit;
   e. the first demineralization unit including a permeate outlet through which a permeate stream flows and a second concentrate outlet through which a second concentrate flows;
   f. a second demineralization unit for treating the second concentrate produced by the first demineralization unit;
   g. the second demineralization unit includes an ion exchange for treating the second concentrate stream and wherein the ion exchange produces a stream of at least partially demineralized water and a third concentrate stream;
   h. a second concentrate line operatively interconnected between the first demineralization unit and the second demineralization unit for conveying the second concentrate stream from the first demineralization unit to the second demineralization unit;
   i. the system further including piping that permits the stream of at least partially demineralized water to be combined with the at least partially desalinated water stream;
   j. wherein the system is further provided with a permeate line operatively connected between the first demineralization unit and the second demineralization unit for channeling the permeate produced by the first demineralization unit to the second demineralization unit; and
   k. wherein the permeate stream directed to the second demineralization unit is operative to regenerate resin used by the ion exchange of the second demineralization unit.

* * * * *